(12) United States Patent
Saito et al.

(10) Patent No.: US 6,765,760 B2
(45) Date of Patent: Jul. 20, 2004

(54) DISC DRIVE SUSPENSION

(75) Inventors: Noriyuki Saito, Aiko-gun (JP); Hideki Kashima, Aiko-gun (JP); Chihiro Kono, Yokohama (JP)

(73) Assignee: NHK Spring Co., Ltd., Yokohama (JP)

( * ) Notice: Subject to any disclaimer, the term of this patent is extended or adjusted under 35 U.S.C. 154(b) by 77 days.

(21) Appl. No.: 10/161,813

(22) Filed: Jun. 4, 2002

(65) Prior Publication Data

US 2003/0011935 A1 Jan. 16, 2003

(30) Foreign Application Priority Data

Jul. 12, 2001 (JP) .................................. 2001-374533

(51) Int. Cl.⁷ .......................................... G11B 21/16
(52) U.S. Cl. .................................................. 360/244.5
(58) Field of Search ...................... 360/244.5, 224.3, 360/244.2, 244.8, 245.2, 245.9

(56) References Cited

U.S. PATENT DOCUMENTS

| | | | |
|---|---|---|---|
| 4,167,765 A | | 9/1979 | Watrous |
| 4,884,154 A | | 11/1989 | Onodera et al. |
| 4,991,045 A | | 2/1991 | Oberg |
| 5,081,553 A | | 1/1992 | Wanlass et al. |
| 5,185,683 A | | 2/1993 | Oberg et al. |
| 5,201,458 A | | 4/1993 | Hagen |
| 5,299,081 A | | 3/1994 | Hatch et al. |
| 5,526,205 A | | 6/1996 | Aoyagi et al. |
| 5,543,985 A | | 8/1996 | Donnelly et al. |
| 5,754,358 A | * | 5/1998 | Yatsu ....................... 360/78.09 |
| 5,777,826 A | | 7/1998 | Tsuchida et al. |
| 5,870,252 A | | 2/1999 | Hanrahan |
| 5,901,016 A | * | 5/1999 | Iwamoto .................. 360/245.9 |
| 5,914,835 A | | 6/1999 | Girard et al. |
| 5,936,804 A | | 8/1999 | Riener et al. |
| 5,991,122 A | | 11/1999 | Tangren et al. |
| 6,014,290 A | | 1/2000 | Supramaniam et al. |
| 6,043,956 A | * | 3/2000 | Hanya et al. ............ 360/244.9 |
| 6,163,953 A | * | 12/2000 | Shiraishi et al. ......... 29/603.03 |
| 6,381,099 B1 | * | 4/2002 | Mei ......................... 360/244.3 |
| 6,388,842 B1 | | 5/2002 | Murphy |
| 6,417,995 B1 | * | 7/2002 | Wu et al. .................... 360/245 |
| 6,433,967 B1 | | 8/2002 | Arya |
| 6,515,832 B1 | * | 2/2003 | Girard ..................... 360/245.3 |
| 6,529,350 B1 | * | 3/2003 | Itoh ........................ 360/264.2 |
| 6,552,877 B2 | | 4/2003 | Tokuyama et al. |
| 6,597,538 B1 | | 7/2003 | Kashima et al. |

FOREIGN PATENT DOCUMENTS

JP    2001-155458    6/2001

OTHER PUBLICATIONS

Related U.S. application Ser. No. 10/161,788, filed Jun. 4, 2002; Inventors: Masao Hanya et al; Title: Disc Drive Suspension.
Related U.S. application Ser. No. 10/161,789, filed Jun. 4, 2002, Inventors: Eiji Watadani et al; Title: Disc Drive Suspension.

\* cited by examiner

Primary Examiner—A. J. Heinz
Assistant Examiner—Angel Castro
(74) Attorney, Agent, or Firm—Frishauf, Holtz, Goodman & Chick, P.C.

(57) ABSTRACT

A suspension comprises a base plate, a load beam, and a hinge member. An extending portion is provided on the side of the hinge member. A step forming portion is formed between the base plate mounting portion and the extending portion. The step forming portion has a difference in level such that the extending portion is situated inside the base plate mounting portion with respect to its thickness direction. An end portion of the flexure fixed on the extending portion is situated inside the surface of the base plate mounting portion with respect to the thickness direction.

8 Claims, 9 Drawing Sheets

DISC DRIVE SUSPENSION

CROSS-REFERENCE TO RELATED APPLICATIONS

This application is based upon and claims the benefit of priority from the prior Japanese Patent Application No. 2001-374533, filed Dec. 7, 2001, the entire contents of which are incorporated herein by reference.

BACKGROUND OF THE INVENTION

1. Field of the Invention

The present invention relates to a disc drive suspension incorporated in an information processing apparatus such as a personal computer.

2. Description of the Related Art

Figure 14:
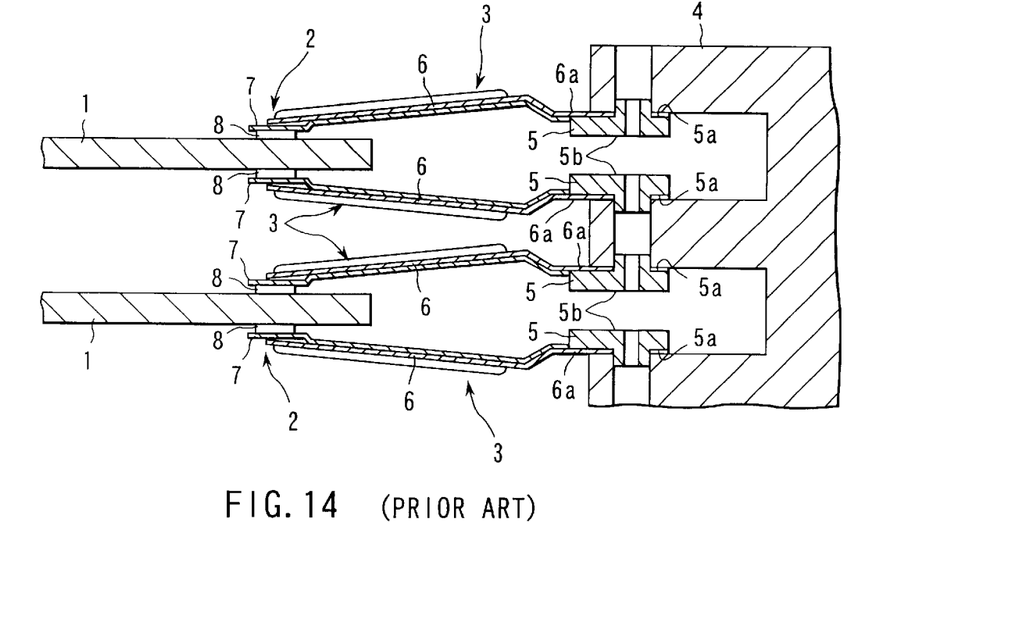
FIG. 14 is a sectional view of a part of a hard disc drive provided with conventional suspensions.

FIG. 14 shows a part of a hard disc drive (HDD). This disc drive comprises suspensions 3 and actuator arms 4 on which the suspensions 3 are mounted, individually. Each suspension 3 supports a magnetic head portion 2 for recording on or reading information from the recording surface of a disc 1 for use as a recording medium. The actuator arms 4 can be turned around a shaft (not shown) by means of a positioning motor (not shown).

Each suspension 3 is provided with a base plate 5, a load beam 6 extending from the base plate 5 toward the head portion 2, a flexure 7, etc. A proximal portion 6a of the load beam 6 is lapped and fixed on one surface 5a of the base plate 5 with respect to its thickness direction. The flexure 7 is fixed on the load beam 6 by laser welding. A slider 8 that constitutes the head portion 2 is mounted on the distal end portion of the flexure 7.

The flexure 7 that is provided with a wiring portion that extends along the load beam 6 from the head portion 2 toward the base plate 5. An end portion of the flexure 7 is fixed to an extending portion (not shown) that projects sideways from the proximal portion 6a of the load beam 6. External lead wires are connected (or bonded) to electrode pads on the end portion of the flexure 7.

As a means of fixing the base plate 5 on the actuator arm 4, a boss portion is proposed such that it is caulked on the base plate 5, as shown in FIG. 14. More specifically, a support jig (not shown) is inserted into the respective base plates 5 of each two adjacent suspensions 3, and the boss portion of each base plate 5 supported by means of the support jig is caulked.

In a suspension proposed as an alternative form, a proximal portion 6a of a load beam 6 is lapped and fixed on the other surface 5b of a base plate 5. In the case of the suspension of this type, the proximal portion 6a of the load beam 6 may be also provided with an extending portion on which an end portion of a wired flexure 7 is fixed.

If the extending portion and the proximal portion 6a of the load beam 6 are flush with each other, however, the end portion of the wired flexure that is fixed on the extending portion inevitably projects outward in the thickness direction of the base plate 5. Thus, there is a danger of the support jig interfering with the end portion of the flexure.

BRIEF SUMMARY OF THE INVENTION

Accordingly, the object of the present invention is to provide a disc drive suspension capable of avoiding interference between an end portion of a flexure and a jig or the like.

According to a first aspect of the present invention, a step forming portion with a difference in level in its thickness direction is formed by press molding or the like between a base plate mounting portion and an extending portion that is formed on the side of a load beam, a flexure, or a hinge member. According to this disc drive suspension, the flexure that is fixed on the extending portion can be prevented from interfering with a jig for fixing the base plate or the like. Further, the step forming portion serves to enhance the bending stiffness of the extending portion and its surroundings.

Preferably, the step forming portion has a difference in level to ensure the flexure fixed on the extending portion is not situated on the extension of the surface of the base plate mounting portion. According to this configuration, a wiring portion or the like of the flexure that is fixed on the extending portion of the hinge member can be prevented from interfering with the jig or the like.

In the present invention, an end portion of the flexure may extend rearward from the base plate mounting portion. According to this configuration, an intermediate portion of the flexure with respect to its longitudinal direction can be fixed on the extending portion.

According to a second aspect of the invention, there is provided a suspension that comprises an extending portion protruding sideways from a proximal portion of a load beam, and in which a step forming portion is formed between the proximal portion of the load beam and the extending portion. According to this invention, the step forming portion that is formed between the proximal portion of the load beam and the extending portion serves to prevent the flexure on the extending portion from interfering with the jig or the like. The step forming portion also serves to enhance the bending stiffness of the extending portion and its surroundings.

Preferably, in the present invention, the step forming portion has a difference in level to ensure the wired flexure fixed on the extending portion is not situated on the extension of the surface of the proximal portion. According to this configuration, a wiring portion of the wired flexure that is fixed on the extending portion of the load beam can be prevented from interfering with the jig or the like.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the embodiments given below, serve to explain the principles of the invention.

DETAILED DESCRIPTION OF THE INVENTION

A first embodiment of the present invention will now be described with reference to FIGS. 1 to 8.

Figure 4:
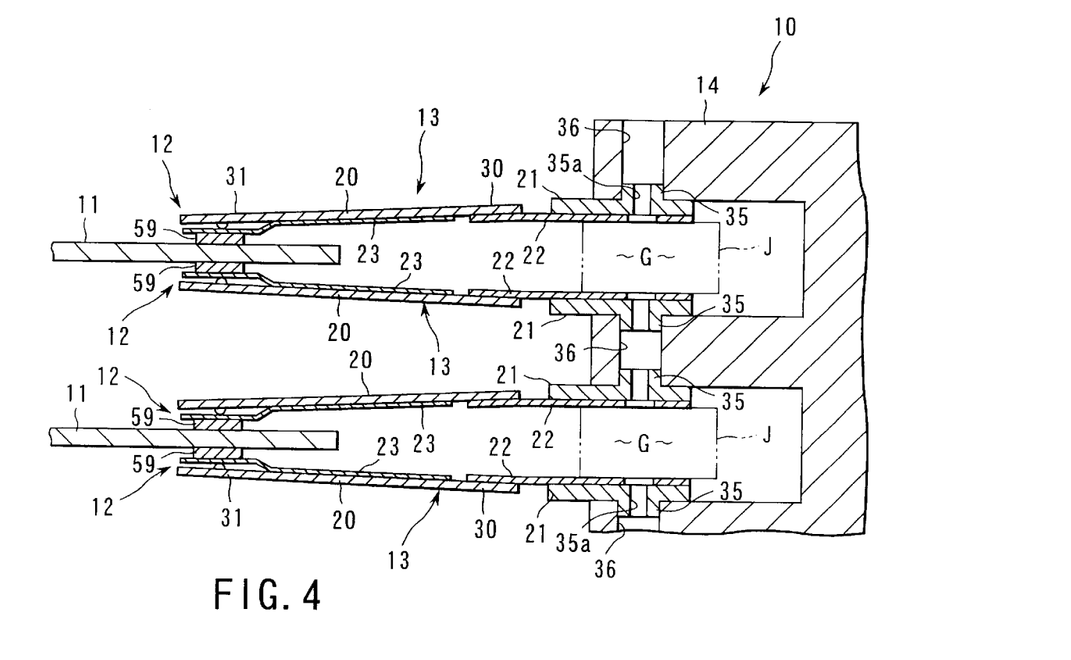
FIG. 4 is a sectional view of a part of a disc drive provided with the suspension shown in FIG. 1.

A hard disc drive (HDD) 10 shown in FIG. 4 comprises a plurality of discs 11 for use as recording media, a plurality of suspensions 13 each having a head portion 12 for magnetically recording information on or reading it from the recording surface of each disc 11, actuator arms 14, etc. Each actuator arm 14 is an example of an arm member to be fitted with each suspension 13, and can be turned around a shaft (not shown) by means of a positioning motor (not shown).

Figure 1:
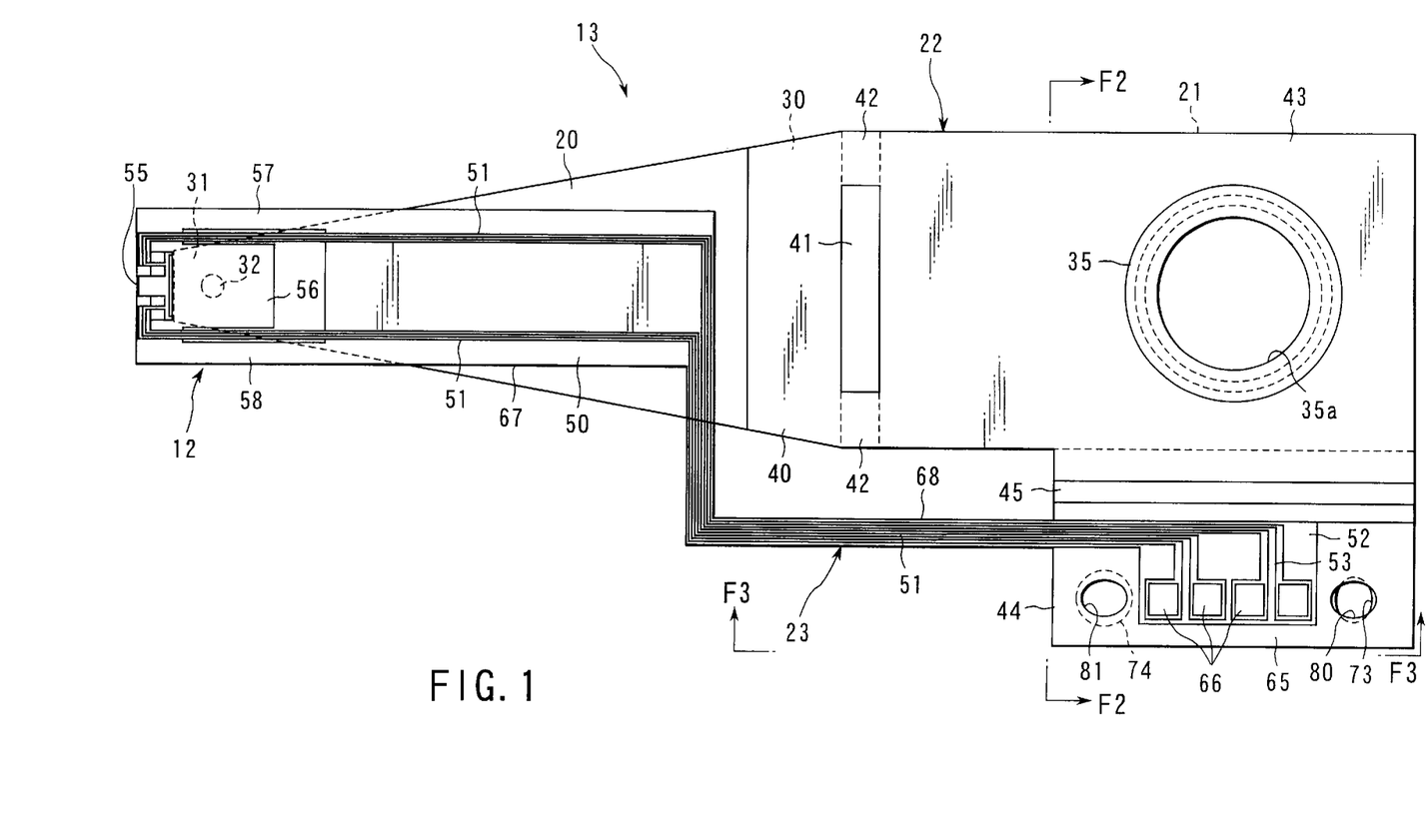
FIG. 1 is a plan view of a disc drive suspension according to a first embodiment of the invention.

As shown in FIG. 1, each suspension 13 includes a load beam 20, a base plate 21, a hinge member 22, a wired flexure 23, etc.

Figure 5:
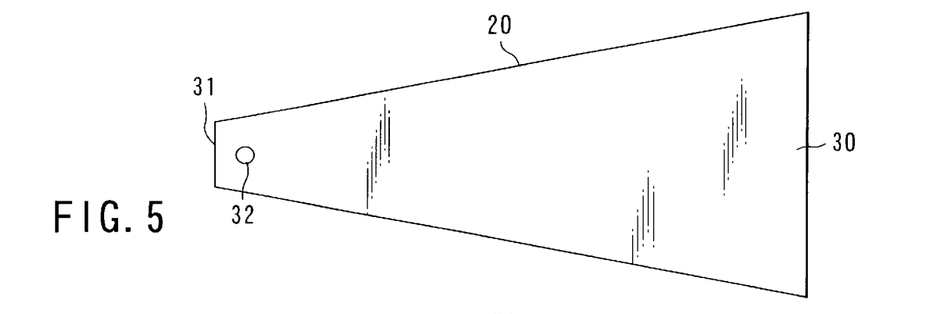
FIG. 5 is a plan view of a load beam of the suspension shown in FIG. 1.

As shown in FIG. 5, the load beam 20 has a proximal portion 30 and a distal end portion 31, and a dimple 32 is formed on the distal end portion 31.

Figure 6:
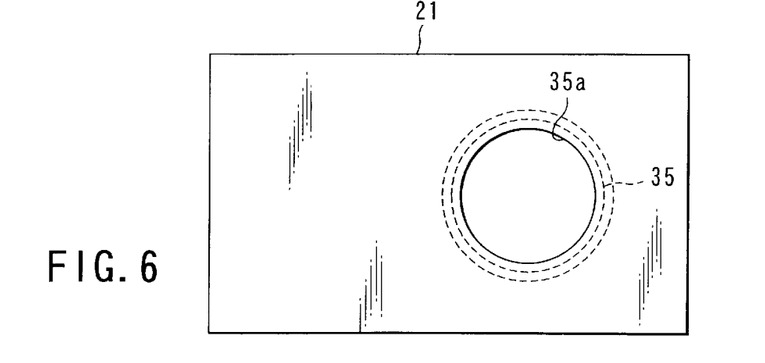
FIG. 6 is a plan view of a base plate of the suspension shown in FIG. 1.

As shown in FIG. 6, a cylindrical boss portion 35 having a circular hole 35a is formed on the base plate 21. The boss portion 35 is inserted into a mounting hole 36 (shown in FIG. 4) in the actuator arm 14. The base plate 21 is fixed to the actuator arm 14 in a manner such that the boss portion 35 is caulked (or plastically deformed) from inside.

Figure 7:
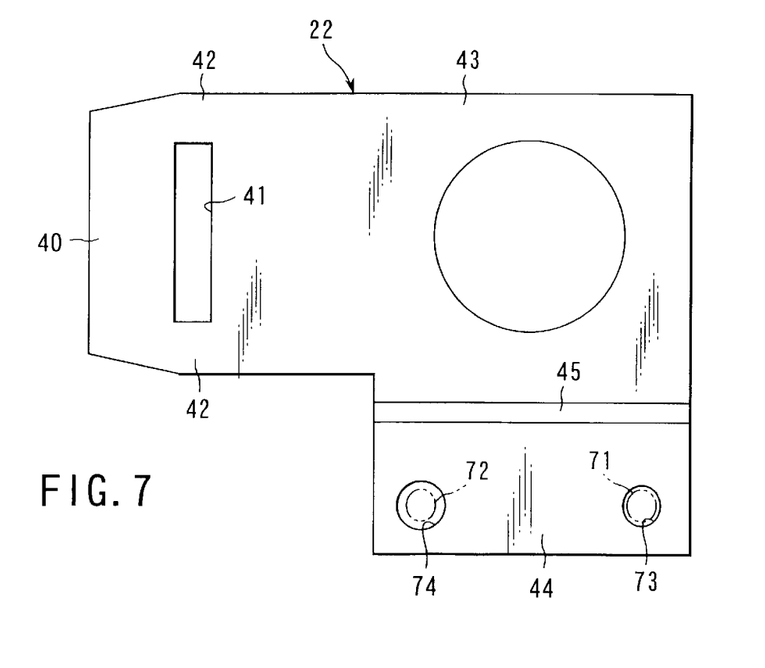
FIG. 7 is a plan view of a hinge member of the suspension shown in FIG. 1.

As shown in FIGS. 1 and 7, the hinge member 22 has an end portion 40 lapped and fixed on the proximal portion 30 of the load beam 20, flexible portions 42 formed individually on the opposite sides of an opening 41 and elastically deformable in its thickness direction, a base plate mounting portion 43 lapped and fixed on the base plate 21, and an extending portion 44 extending sideways from the mounting portion 43.

Figure 2:
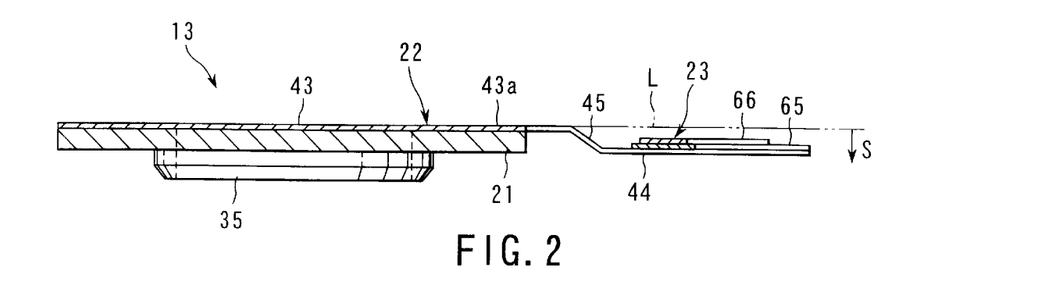
FIG. 2 is a sectional view of the suspension taken along line F2—F2 of FIG. 1.
Figure 3:
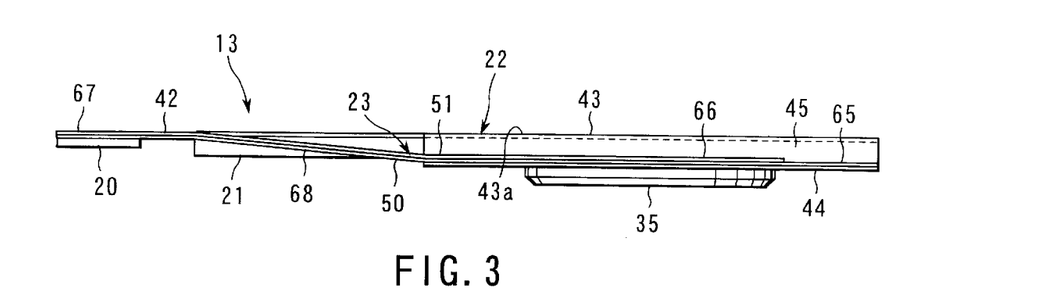
FIG. 3 is a side view of a part of the suspension taken in the direction of arrow F3 of FIG. 1.

As shown in FIGS. 2 and 3, a step forming portion 45 is formed between the extending portion 44 of the hinge member 22 and the base plate mounting portion 43 by press working. The step forming portion 45 has a difference in level such that the extending portion 44 is situated inside a surface 43a of the base plate mounting portion 43 with respect to the thickness direction (or in a region indicated by arrow S in FIG. 2).

Figure 8:
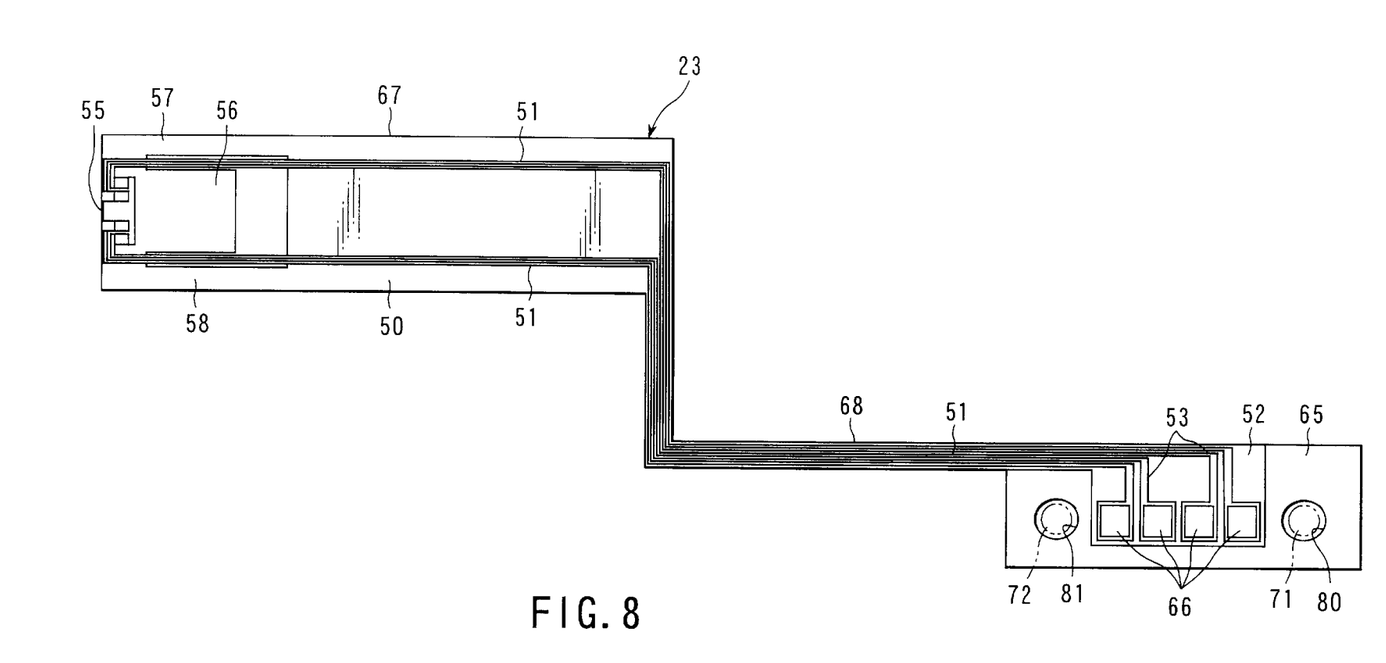
FIG. 8 is a plan view of a flexure of the suspension shown in FIG. 1.

As shown in FIG. 8, the flexure 23 has a metal base 50 formed of a metal sheet as an example of a material that is thinner than the load beam 20 and a wiring portion 51 including a conductive layer 53 that is formed over the surface of the metal base 50 with an electrical insulating layer 52 between them. Thus, the flexure 23 is a so-called wired flexure. The metal base 50 is formed of a springy stainless-steel sheet with a thickness of about 18 µm to 30 µm, for example. The flexure 23 extends along the load beam 20.

A tongue portion 56 that serves as a movable portion and outrigger portions 57 and 58 are formed on a distal end portion 55 of the flexure 23. The outrigger portions 57 and 58 are situated individually on the opposite sides, left and right, of the tongue portion 56. The tongue portion 56 and the outrigger portions 57 and 58 can bend in the thickness direction of the flexure 23. The tongue portion 56 engages a dimple 32 on the distal end portion 31 of the load beam 20. A slider 59 (shown in FIG. 4) is mounted on the tongue portion 56. The slider 59 is provided with a transducer (not shown) for use as a magneto-electric conversion element. The transducer, slider 59, etc. constitute the head portion 12.

Electrode pads 66 are provided on the other end portion 65 of the flexure 23. External lead wires (not shown) are connected to the electrode pads 66. The end portion 65 is lapped and fixed on the extending portion 44 of the hinge member 22. A first intermediate portion 67 that is lapped on the load beam 20 and a belt-shaped second intermediate portion 68 off the load beam 20 are formed between the distal end portion 55 and the other end portion 65 of the flexure 23.

The end portion 65 of the flexure 23 is fixed in a predetermined position on the extending portion 44 of the hinge member 22 by laser welding or adhesive bonding. The extending portion 44 of the hinge member 22 is formed having holes 73 and 74 in which positioning pins 71 and 72 (indicated by a two-dot chain line) can be inserted, respectively. The end portion 65 of the flexure 23 is also formed having holes 80 and 81 for the insertion of the positioning pins 71 and 72. These pins 71 and 72 are provided on the body of a positioning tool (not shown).

As shown in FIG. 4, a gap G that is wide enough to allow the insertion of a support jig J is defined between the respective hinge members 22 of each two adjacent suspensions 13 on the actuator arms 14. In fixing each base plate 21 on its corresponding actuator arm 14, the hinge member 22 is supported by means of the support jig J. In this state, the boss portion 35 is plastically deformed in a manner such that it is pressurized from inside by pressing a caulking part, such as a steel ball larger in diameter than the hole 35a of the boss portion 35, into the hole 35a. By doing this, the base plate 21 can be fixed on the actuator arm 14.

In each suspension 13, the step forming portion 45 is formed between the base plate mounting portion 43 and the extending portion 44 of the hinge member 22. The end portion 65 of the flexure 23 is recessed inside the surface of the base plate mounting portion 43 in the thickness direction. As the support jig J is inserted into the gap G, therefore, there is no possibility of its interfering with the end portion 65 of the flexure 23. Further, the support jig J can be prevented from interfering with the wiring portion 51 or the electrode pads 66.

The step forming portion 45 serves to enhance the stiffness of the extending portion 44 and its surroundings. If the extending portion 44 touches any object during the assembly of the suspension 13 or the like, therefore, it can be restrained from being deformed.

As shown in FIG. 2, the end portion 65 of the flexure 23 or the electrode pads 66 is situated within the region S inside the surface 43a of the base plate mounting portion 43 with respect to the thickness direction. Thus, the overall thickness of the suspension can be made smaller than in the case where the step forming portion 45 is not formed. If the step forming portion 45 is not formed, the end portion 65 of the flexure 23 projects outward in the thickness direction of the hinge member 22. The overall thickness of the suspension described herein is a thickness that covers the base plate 21 and the end portion 65 of the flexure 23.

Figure 9:
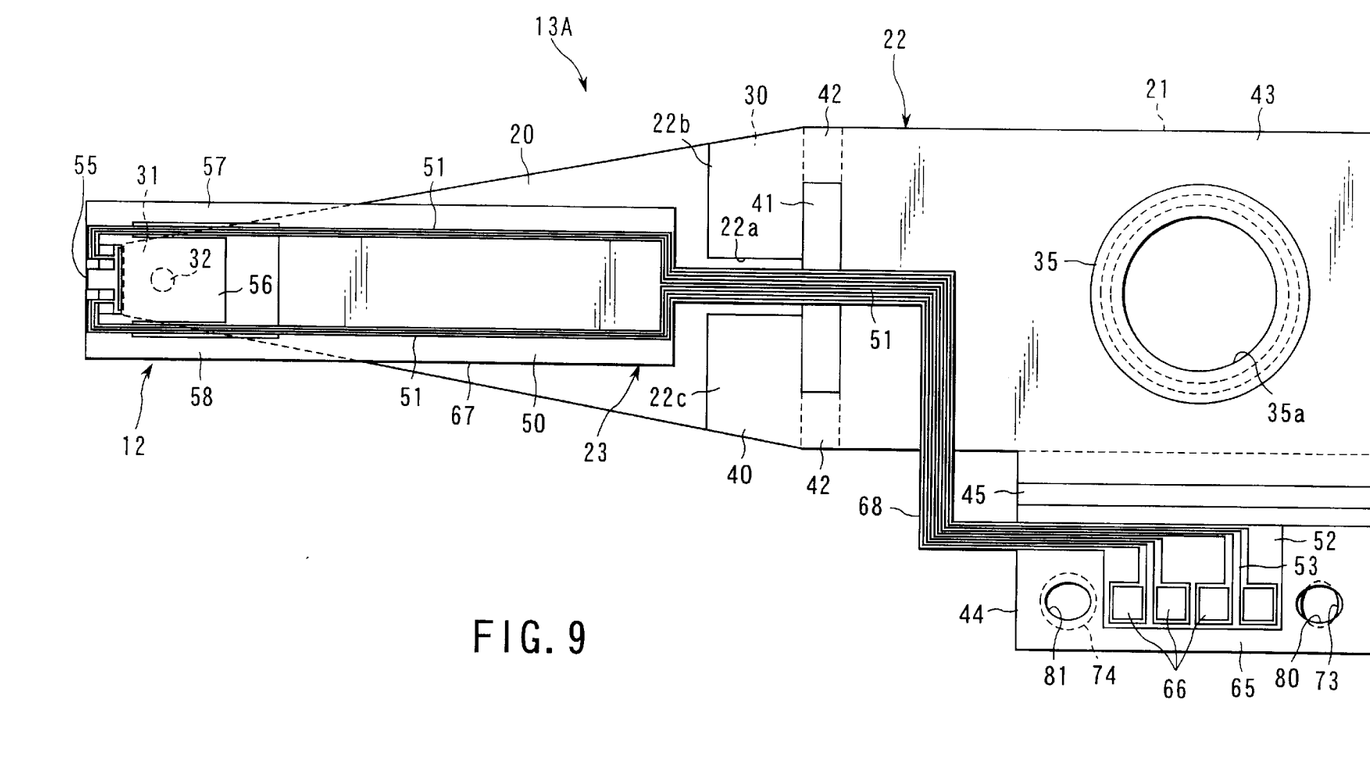
FIG. 9 is a plan view of a disc drive suspension according to a second embodiment of the invention.

FIG. 9 shows a suspension 13A according to a second embodiment of the invention. A slit 22a is formed in an end portion 40 of a hinge member 22 of the suspension 13A. It extends in the longitudinal direction of the hinge member 22 and opens into an opening 41. Coupling portions 22b and 22c that connect with a load beam 20 are formed on the opposite sides of the slit 22a, individually. A part of a flexure 23 passes through the slit 22a in the longitudinal direction.

The hinge member 22 of the suspension 13A is formed having an extending portion 44 and a step forming portion 45, which are similar to those of the suspension 13 of the first embodiment. An end portion 65 of the flexure 23 is lapped and fixed on the extending portion 44. A part of the flexure 23 passes through the slit 22a in the longitudinal direction, and extends from a base plate mounting portion 43 toward the extending portion 44. Since the suspension 13A shares other configurations with the suspension 13 shown in FIG. 1, common numerals are used to designate portions that are common to the two suspensions, and a repeated description of those common portions is omitted.

Figure 10:
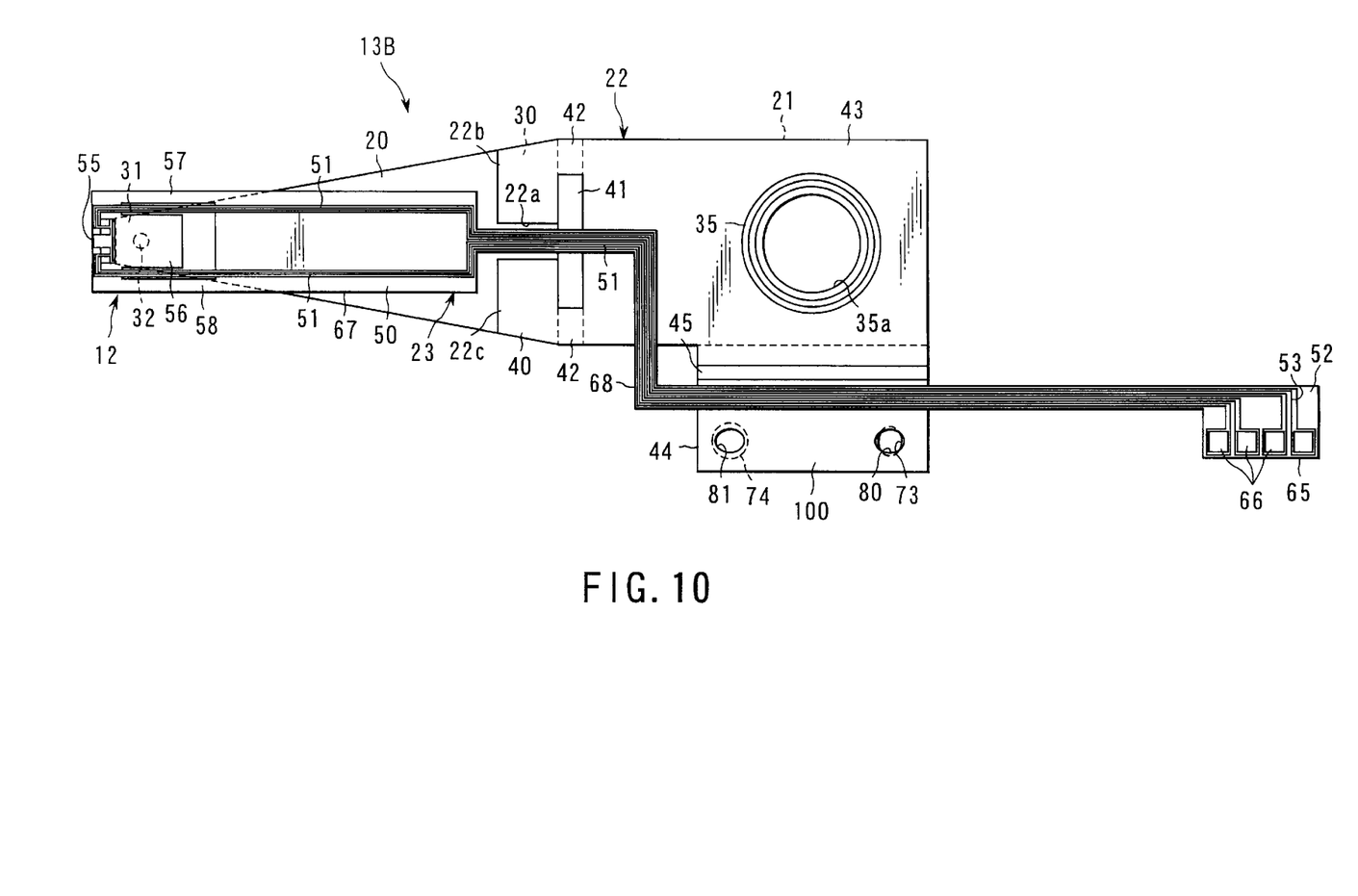
FIG. 10 is a plan view of a disc drive suspension according to a third embodiment of the invention.

FIG. 10 shows a suspension 13B according to a third embodiment of the invention. A hinge member 22 of the suspension 13B is formed having an extending portion 44 and a step forming portion 45, which are similar to those of the suspension 13 of the first embodiment. A flexure 23 of the suspension 13B has an intermediate portion 100 to be lapped on the extending portion 44. The intermediate portion 100 is fixed on the extending portion 44. An end portion 65 of the flexure 23 or electrode pads 66 extends rearward from the hinge member 22. Since the suspension 13B shares other configurations with the suspension 13A shown in FIG. 9, common numerals are used to designate portions that are common to the two suspensions, and a repeated description of those common portions is omitted.

Figure 11:
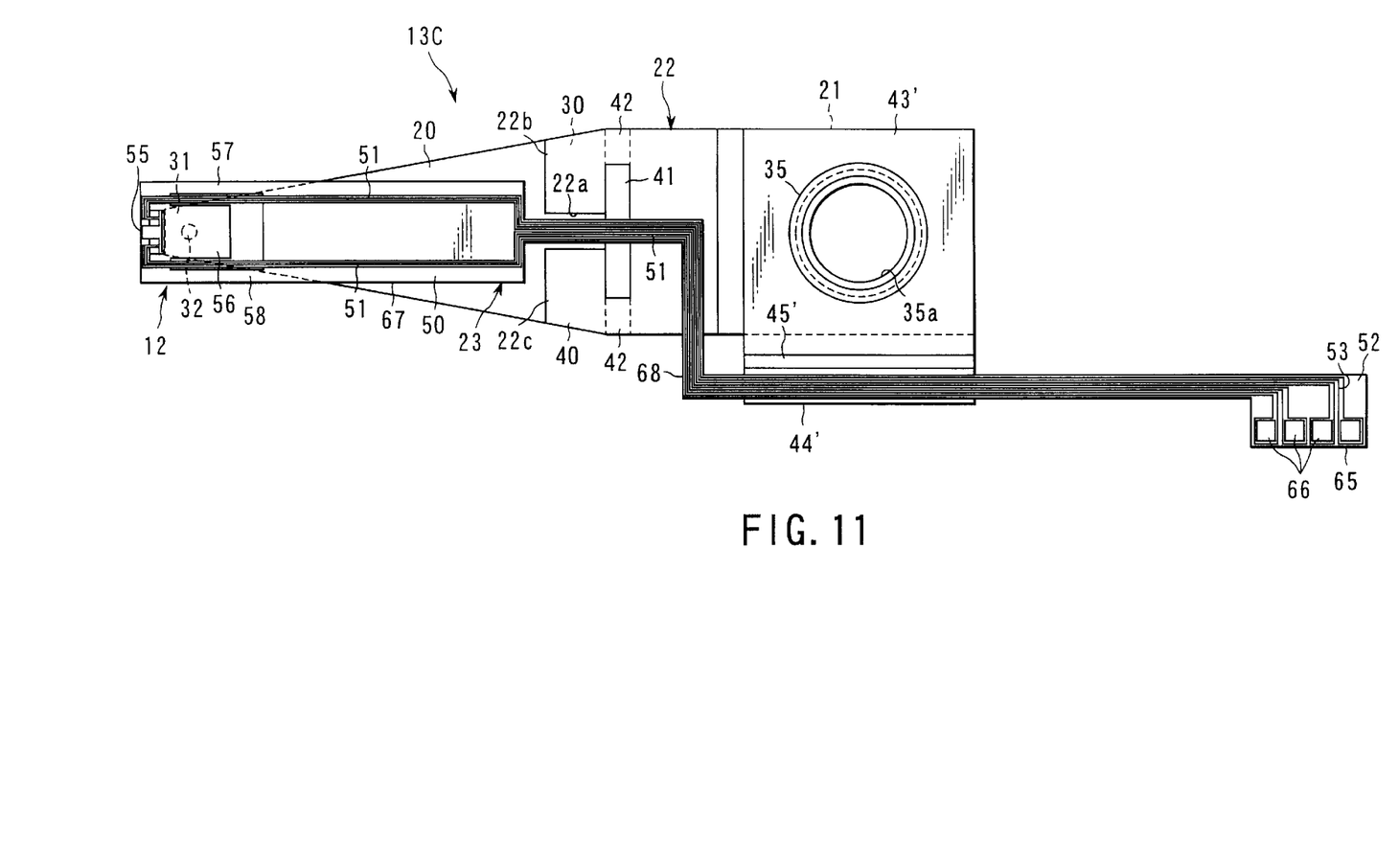
FIG. 11 is a plan view of a disc drive suspension according to a fourth embodiment of the invention.

FIG. 11 shows a suspension 13C according to a fourth embodiment of the invention. A flexure 23 of the suspension 13C has a base plate mounting portion 43' that overlaps a base plate 21 in its intermediate portion with respect to its longitudinal direction. An extending portion 44' and a step forming portion 45' are formed on the base plate mounting portion 43'. The step forming portion 45', like the step forming portion 45 shown in FIG. 2, has a difference in level. Since the suspension 13C shares other configurations with the suspension 13B shown in FIG. 10, common numerals are used to designate portions that are common to the two suspensions, and a repeated description of those common portions is omitted.

Figure 12:
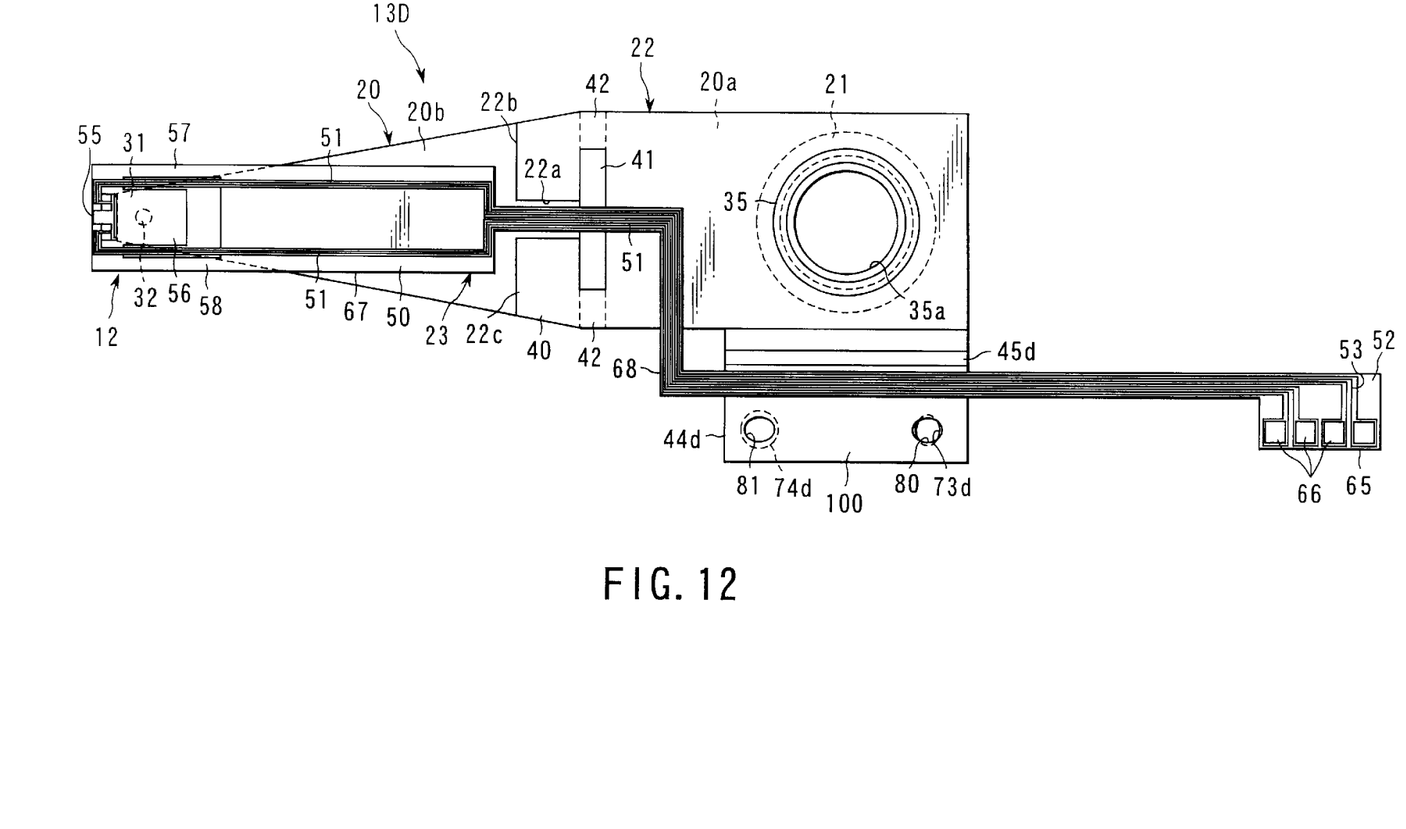
FIG. 12 is a plan view of a disc drive suspension according to a fifth embodiment of the invention.

FIG. 12 shows a suspension 13D according to a fifth embodiment of the invention. A load beam 20 of the suspension 13D has a base plate mounting portion 20a that is situated on the side of a base plate 21 with respect to an opening 41 and a distal end portion 20b on the side of a head portion 12. The base plate 21 having a circular shape is fixed on the base plate mounting portion 20a of the load beam 20. An extending portion 44d and a step forming portion 45d are formed on the base plate mounting portion 20a. Positioning holes 73d and 74d are formed in the extending portion 44d.

The step forming portion 45d on the load beam 20, like the step forming portion 45 shown in FIG. 2, has a difference in level. Since the suspension 13D shares other configurations with the suspension 13B shown in FIG. 10, common numerals are used to designate portions that are common to the two suspensions, and a repeated description of those common portions is omitted.

Figure 13:
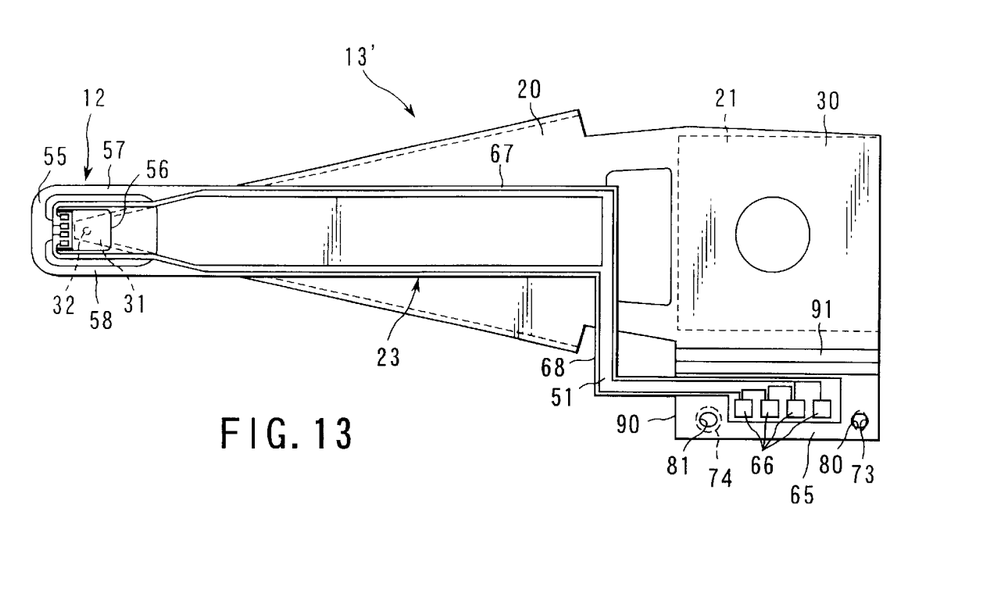
FIG. 13 is a plan view of a disc drive suspension according to a sixth embodiment of the invention.

FIG. 13 shows a suspension 13' according to a sixth embodiment of the invention. In the suspension 13', a base plate 21 is lapped and fixed on a proximal portion 30 of a load beam 20. An extending portion 90 protrudes sideways from the proximal portion 30. A step forming portion 91 is formed between the proximal portion 30 and the extending portion 90. An end portion 65 of a wired flexure 23 is lapped and fixed on the extending portion 90 by laser welding or with an adhesive agent.

The step forming portion 91 is given a difference in level by press working to ensure the end portion 65 of the flexure 23 is not situated on the extension of the surface of the proximal portion 30 of the load beam 20. Positioning holes 73 and 74, which resemble the ones according to the first embodiment, are formed in the extending portion 90. Positioning holes 80 and 81 are also formed in the end portion 65 of the flexure 23. Since the suspension 13' shares other configurations and effects with the suspension 13 of the first embodiment, common numerals are used to designate portions that are common to the two suspensions, and a repeated description of those common portions is omitted.

In carrying out the present invention, it is to be understood that the components of the invention, including the position and shapes of the extending portion and the step forming portion, as well as the specific forms of the load beam, hinge member, and flexure, may be variously changed and modified without departing from the scope or spirit of the invention.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A disc drive suspension comprising:

a base plate;

a load beam having a proximal portion and a distal end portion;

a hinge member fixed on the proximal portion of the load beam and the base plate and having a flexible portion elastically deformable in the thickness direction thereof and a base plate mounting portion;

a flexure fixed on the load beam and having a head portion on the distal end side thereof;

an extending portion provided on a side of the base plate mounting portion of the hinge member and having the flexure lapped and fixed thereon; and a step forming portion formed on the hinge member between the extending portion and the base plate mounting portion.

2. A suspension according to claim 1, wherein said step forming portion has a difference in level to ensure the flexure fixed on the extending portion is not situated on the extension of a surface of the base plate mounting portion.

3. A disc drive suspension comprising:

a base plate;

a load beam having a proximal portion and a distal end portion;

a hinge member fixed on the proximal portion of the load beam and the base plate and having a flexible portion elastically deformable in the thickness direction thereof and a base plate mounting portion;

a flexure having a head portion thereon and a base plate mounting portion provided on an intermediate portion with respect to the longitudinal direction thereof and fixed on the base plate;

an extending portion provided on a side of the base plate mounting portion of the flexure; and a step forming portion formed on the flexure between the extending portion and the base plate mounting portion.

4. A suspension according to claim 3, wherein a part of said flexure passes through a slit in the hinge member in the longitudinal direction thereof.

5. A disc drive suspension comprising:

a base plate;

a load beam having a base plate mounting portion fixed on the base plate and a distal end portion independent of the base plate mounting portion;

a hinge member connecting the base plate mounting portion and the distal end portion of the load beam;

a flexure fixed on the load beam, having an intermediate portion with respect to the longitudinal direction thereof, and having a head portion thereon;

an extending portion provided on a side of the base plate mounting portion of the load beam and having the intermediate portion of the flexure fixed thereon; and a step forming portion formed on the load beam between the extending portion and the base plate mounting portion.

6. A suspension according to claim 5, wherein a part of said flexure passes through a slit in the hinge member in the longitudinal direction thereof.

7. A suspension according to claim 6, wherein an end portion of said flexure extends rearward from the base plate mounting portion.

8. A suspension according to claim 5, wherein an end portion of said flexure extends rearward from the base plate mounting portion.

* * * * *